United States Patent [19]

Massey

[11] 4,361,721
[45] Nov. 30, 1982

[54] SPLICE CASE WITH TIGHT SEALING GROMMET

[75] Inventor: John R. Massey, Lawrenceville, Ga.

[73] Assignee: Bell Telephone Laboratories, Incorporated, Murray Hill, N.J.

[21] Appl. No.: 151,919

[22] Filed: May 21, 1980

[51] Int. Cl.³ .......................................... H02G 15/10
[52] U.S. Cl. ................................. 174/92; 174/77 R; 174/65 G; 277/209
[58] Field of Search ............... 174/92, 152 G, 153 G, 174/65 G, 93, 77 R; 277/208, 209, 210

[56] References Cited

U.S. PATENT DOCUMENTS

| | | | |
|---|---|---|---|
| 2,771,502 | 11/1956 | King et al. | 174/92 |
| 3,254,153 | 5/1966 | Kohler | 174/93 |
| 3,288,407 | 11/1966 | Downer et al. | 174/153 G |
| 3,636,241 | 1/1972 | Baumgartner et al. | 174/92 |
| 3,663,740 | 5/1972 | Dellett | 174/92 |
| 3,705,950 | 12/1972 | Jirka | 174/93 X |
| 3,796,823 | 3/1974 | Wright et al. | 174/92 |
| 3,916,086 | 10/1975 | Gillemot et al. | 174/93 |
| 4,002,818 | 1/1977 | Kunze | 174/21 R |
| 4,262,167 | 4/1981 | Bossard et al. | 174/92 |

FOREIGN PATENT DOCUMENTS 1750427 2/1971 Fed. Rep. of Germany ...... 277/208

*Primary Examiner*—Arthur T. Grimley
*Assistant Examiner*—D. A. Tone
*Attorney, Agent, or Firm*—J. W. Fisher

[57] ABSTRACT

A sealing grommet (40), used in cable splice cases (10) for connecting multiconductor telecommunication cables (100, 120), comprises a unitary elastomeric body with cable receiving passageways (50, 70). Each passageway is defined by an interior sidewall (52, 72) from which a plurality of longitudinally spaced circumferential ridges (54, 74) extend. For a substantial portion of its circumference, each ridge has an axis of projection (60, 82) which forms an oblique angle ($\alpha$, $\beta$) with respect to the axis (58, 80) of the passageway and is sufficiently elongated in longitudinal cross section so as to be capable of flexing with respect to the axis of projection during cable insertion and enlarging its opening diameter ($D_R$, $D_{SR}$) to accommodate and form a radial seal about a cable being inserted.

16 Claims, 8 Drawing Figures

SPLICE CASE WITH TIGHT SEALING GROMMET

TECHNICAL FIELD

This invention relates to the termination of multiconductor telecommunication cables in splice cases or the like, and more particularly to members used in splice cases to sealably engage the cables.

BACKGROUND OF THE INVENTION

Cables known as tip cables are used between a central office cable entrance facility and the wire terminating frames in a central office. Tip cables are designed to be fire-resistant and are typically jacketed with fire-resistant and low-smoke producing sheaths. A commonly used tip cable, which comprises a cable core with a plurality of insulated conductors surrounded by a plastic core wrap, has a protective sheath known as the ALVYN sheath. The ALVYN sheath comprises an overlapped, corrugated aluminum shield surrounding the cable core and a relatively thin extruded polyvinyl chloride (PVC) outer jacket.

The tip cables are spliced in vault closures in the cable entrance facility to feeder cables entering the central office from the outside plant. The vault closures must be waterproof and gas tight to prevent entrance of water.

While the ALVYN sheaths of the tip cables are desirable for their fire-resisting properties, they are relatively soft and have less desirable mechanical properties, making the tip cables difficult to seal at their entry into a vault closure. One problem is that if much pressure is applied by a sealing member onto the tip cable, the shield will circumferentially slip over itself, causing the PVC jacket to fold or form a buckled region which can easily tear and develop a leak. This gets aggravated if there are any attempts to grip the PVC jacket to provide strain relief in the closure.

Another problem is that the tip cables are not always perfectly round in cross section because of the softness of the sheath. Also, the actual outside diameters of the cables vary somewhat depending on how the core conductors actually pack together during cable manufacture.

Thus, one object of this invention is to develop a sealing grommet for a splice case or the like, where the grommet can effect a gas tight seal about a soft-sheathed cable, and at the same time be sufficiently gentle on the cable so that the cable sheath will not tend to collapse or leak.

It is a second object that the sealing grommet permit easy cable insertion.

It is a third object that the sealing grommet be effective in gripping the cable for strain relief.

It is a fourth object that the sealing grommet allow for a range of dimensional variations in the cables sealed.

It is a fifth object that the sealing grommet be easy and inexpensive to manufacture.

SUMMARY OF THE INVENTION

Pursuant to the above objects and others, a sealing grommet has been developed which effectively seals and grips soft-sheathed cables. This is achieved with a sealing grommet which is a unitary elastomeric body having individual cable receiving passageways. In each passageway, a plurality of longitudinally spaced circumferential ridges extend integrally from an interior sidewall to define a plurality of radial sealing surfaces for engaging a cable.

Each ridge defines an opening normally smaller than the diameter of any cable to be accommodated. Also, for a substantial portion of its circumference, each ridge has an axis of projection which forms an oblique angle with respect to the axis of the passageway and is sufficiently elongated in longitudinal cross section so as to be capable of flexing about the axis of projection along the substantial portion as needed to enlarge the opening and engage a cable in sealing relation.

Each ridge is also angularly disposed toward an inner face of the grommet and configured so as to be capable of increasing its grip on a cable by deforming to resist attempted cable pull out from an outer face of the grommet.

For any given amount of radial deflection of the ridges, the forces generated by flexing the ridges are substantially less than the forces generated by compressing and deforming the material from which the ridges of each grommet passageway are made. Hence, the forces applied by each ridge in making a radial seal about the inserted cable are somewhat gentle. However, if necessary to resist cable pull out, each ridge will increase its grip on the inserted cable by materially deforming.

The invention and its further objects, features, and advantages will be readily discerned from a reading to follow of illustrative embodiments.

DETAILED DESCRIPTION

Figure 1:
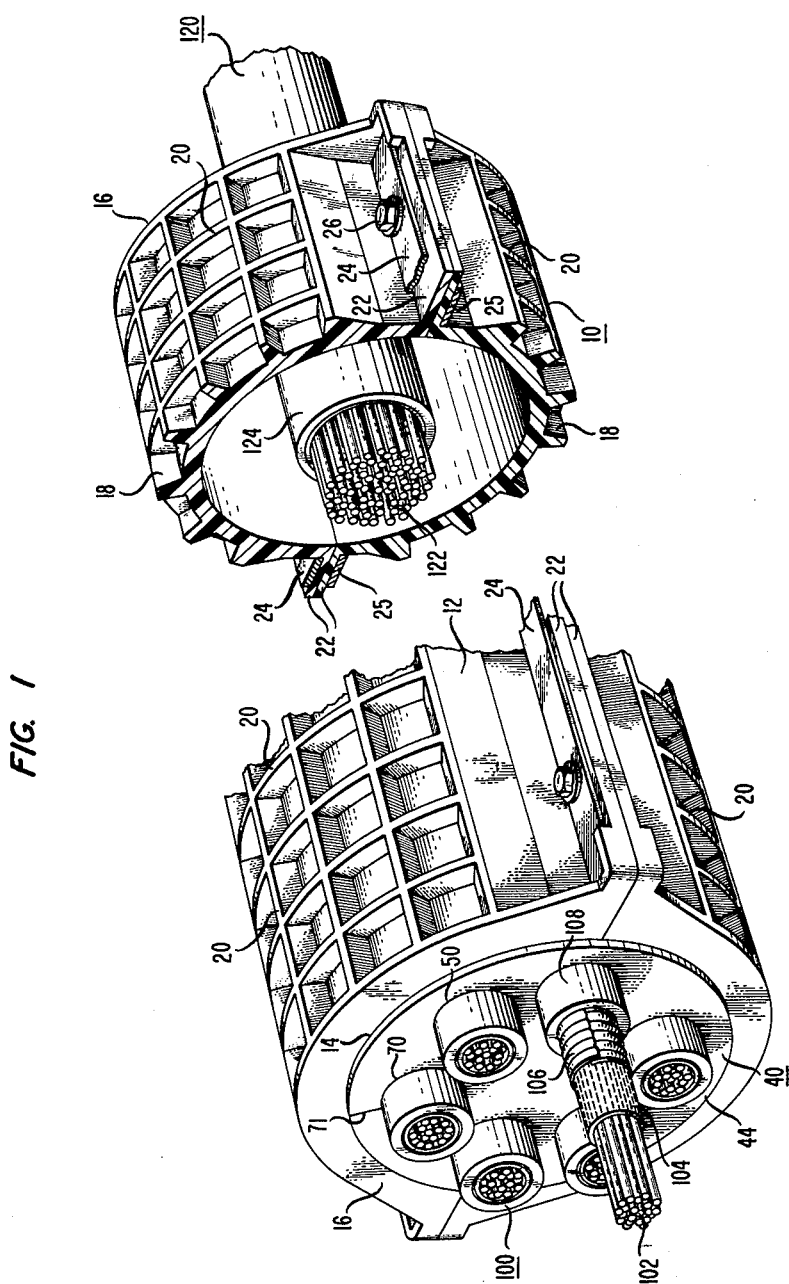
FIG. 1 is a front perspective view in partial cutaway of a cable splice case with the inventive sealing grommet engaging a plurality of tip cables at the visible end.

Depicted in FIG. 1 is an illustrative embodiment 10 of a cable splice case which can be used to house the connections between a plurality of tip cables 100 and a feeder cable 120, respectively.

Each tip cable 100 comprises a plurality of insulated conductors 102, a plastic core wrap 104 surrounding the conductors 102, an overlapped aluminum shield 106, and an extruded PVC outer jacket 108. The feeder cable 120 comprises a plurality of insulated conductors 122 and a cable sheath 124. The feeder cable 120 can be made with any of a number of cable sheaths 124 known in the art depending on where and how the feeder cable is to be used in the outside plant environment.

The splice case 10 comprises a substantially tubular casing 12 with circular access openings 14 at either longitudinal end 16, a sealing grommet 40 for engaging the tip cables 100 entering at the visible end 16 in FIG. 1, and a conventional end plate (not shown) for engaging the feeder cable 120 coming in from the other end 16.

While the end plate for feeder cable is not shown, any of various conventional end plates known in the art can be used. The actual end plate used is similar to one disclosed in U.S. Pat. No. 3,636,241, issued to Baumgartner et al and assigned to the assignee of this application. To the extent that the Baumgartner et al patent is relevant to this application, the patent is hereby incorporated by reference.

In the illustrative embodiment, the casing 12 includes two substantially half-tubular shells 18 which are molded from a fire-resisting polypropylene. Each shell 18 includes on its outer surface a plurality of structurally reinforcing ribs 20 and a longitudinally-extending flange 22 at either longitudinal edge.

The shells 12 are joined together along their flanges 22. Each flange 22 includes a plurality of longitudinally spaced apertures, which are designed to align with the apertures of its mating flange 22 on the other shell 18. A pair of metallic bars 24, 25 and a plurality of threaded bolts 26 are used to join each mating set of flanges 22. The metallic bars 24, 25 have clearance holes and threaded bores, respectively, which align with the apertures in the mating flanges 22. The bars 24, 25 sandwich the flanges 22 and are held together with bolts 26. During assembly of the splice case 10, the bolts 26 thread through corresponding clearance holes and apertures in the bars 24 and the mating pairs of flanges 22, respectively, to threadably engage corresponding threaded bores in the metallic bars 25.

It is apparent that other means conventional in the art can also be used to join the shells 18.

Figure 2:
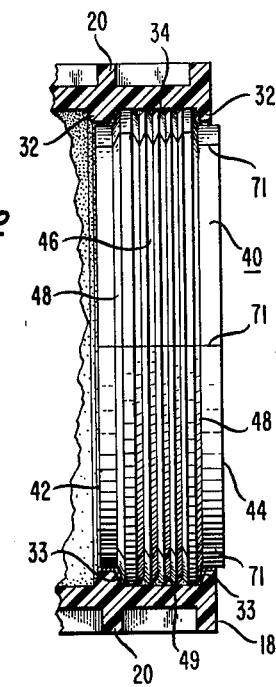
FIG. 2 is a partial longitudinal cross-sectional view of the sealing grommet and the shells of the casing.

On the interior surface near either longitudinal end 16 of the casing 12, each shell 18 has a pair of annular ribs 32 which together define half of an annular groove 34 for seating an end member such as the sealing grommet 40 as seen in FIG. 2.

The sealing grommet 40, which is a unitary body molded from an elastomeric material such as urethane rubber, includes an inner face 42, an outer face 44, and a substantially longitudinally-extending outer surface 46. The outer surface 46 includes a plurality of annular ribs 49 and is stepped at either face 42, 44 to define a substantially radial shoulder 48. The ribs 49 are designed to seat in the annular groove 34 with the shoulders 48 abutting appropriate facing surfaces 33 on the annular ribs 32 of the shells 18.

When the shells 18 are joined together as shown in FIG. 2, they radially compress the ribs 49 to effect a tight seal between the grommet 40 and the shells 18. To help ensure an effective seal, sealing compound is also applied to the ribs 49 so that voids between the ribs 49 and the annular groove 34 are filled.

Figure 3:
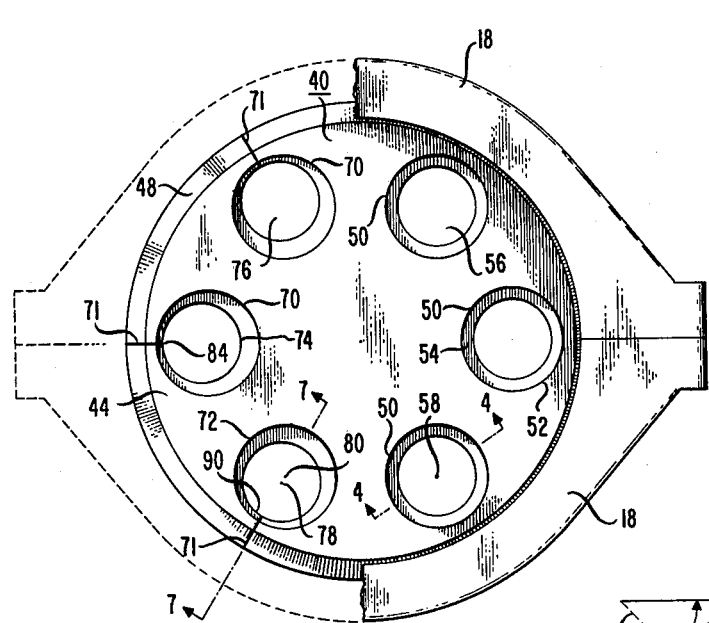
FIG. 3 is the front end of the FIG. 1 splice case with the tip cables not shown and half of each of the shells cut away to show the slits of the slitted cable receiving passageways in the grommet.

As seen in FIG. 3, when securely held by the shells 18, the grommet has a circular transverse cross section. However, before the grommet 40 is secured, the grommet is actually slightly elliptical in transverse cross section with a minor axis having a length substantially equal to the diameter of the access opening 14 and a major axis having a length somewhat greater than the diameter of the access opening 14. During assembly of the splice case 10, the grommet 40 is oriented with the major axis substantially normal to a plane containing the flanges 22 so as to receive compressive forces from the shells 18 as they are joined to form a snug fit.

To make the grommet 40 fire-resistant in the illustrative embodiment, the grommet 40 is coated with a layer of urethane rubber containing a fire-resistant additive on the outer grommet face 44.

Referring to FIG. 3, the grommet 40 is illustrated with six cable receiving passageways 50, 70. It is common, however, for a typical sealing grommet 40 to have up to 36 or more passageways. Also, the grommet 40 is shown with two types of passageways, i.e., non-slitted passageways 50 and slitted passageways 70. In actual applications, the passageways in any grommet 40 will all either be slitted or non-slitted.

A grommet having the non-slitted passageways 50 is used primarily in a splice case 10 where the tip cables 100 are to be spliced for the first time and can pass longitudinally through the passageways 70.

Figure 4:
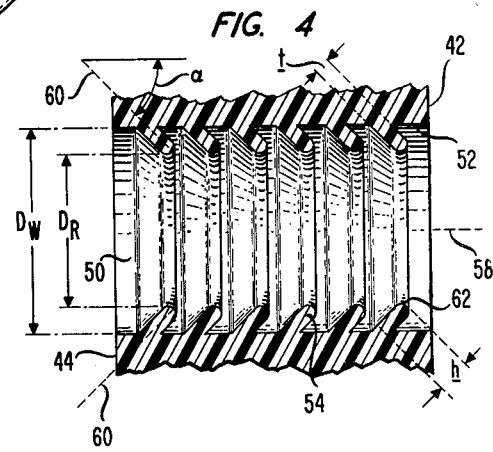
FIG. 4 is an enlarged longitudinal cross section taken along line 4—4 in FIG. 3 of one of the non-slitted cable receiving passageways.

Referring to FIGS. 3 and 4, each non-slitted passageway 50 includes a cylindrical interior sidewall 52 which has a nominal diameter $D_W$ larger than the diameter of any cable 100 to be inserted, and a plurality of longitudinally spaced and radially continuous circumferential ridges 54 which define substantially circular openings 56 normally having diameters $D_R$ smaller than the diameter of any cable 100 to be inserted. The ridges 54 are in longitudinal alignment with one another such that an imaginary line containing the centers of the openings 56 of all the ridges 54 would substantially coincide with the longitudinal axis 58 of the interior sidewall 52 and the passageway 50.

Referring to FIG. 4, each ridge 54 has in longitudinal cross section an axis of projection 60 which forms an oblique angle with respect to the axis 58 such that the ridge 54 is angularly disposed toward the inner grommet face 42. Also, in longitudinal cross section, each ridge 54 is substantially oblong-like with a rounded free end 62 and is sufficiently elongated so as to be capable of flexing with respect to the axis of projection 60. A rounded free end 62 is desirable in helping to provide a continuous surface when the ridge 54 engages an inserted cable 100. Because of the angularity and projected length of each ridge 54, each ridge 54 can readily flex inward to enlarge the opening 56 it defines and accommodate a cable 100 being inserted from the outer grommet face 44.

In the illustrative embodiment, the axis of projection 60 of each ridge 54 forms a 45 degree angle with respect to the axis 58. A larger α angle of 60 degrees may be desired to allow more leeway in flexing and hence to accommodate a greater range of cable diameters. However, a grommet 40 in which the ridges 54 have a 45 degree angle is simpler to manufacture.

To ensure independent operation of each ridge 54, the ridges 54 are spaced sufficiently apart longitudinally to not interfere with each other when flexing during cable insertion. As a result, a number of longitudinally discontinuous and independently formed radial seals can be made about an inserted cable 100. The redundancy in radial seals also helps to ensure a gas tight fit on any cable 100.

Figure 5:
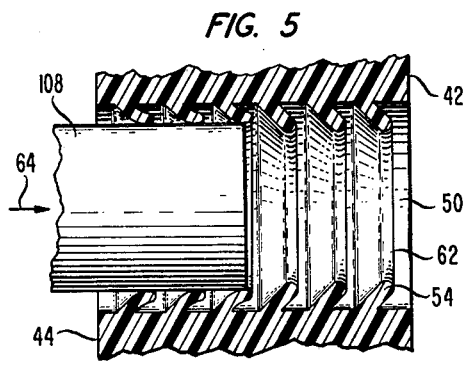
FIG. 5 is the FIG. 4 non-slitted passageway showing the circumferential ridges flexing as a cable is inserted.

FIG. 5 shows a cable 100 being inserted into the non-slitted passageway 50 from the outer grommet face 44, as denoted by arrow 64. Each ridge 54 readily flexes inward in response to cable insertion to enlarge its opening diameter $D_R$ (FIG. 4) as needed to form a radial seal about the cable 100. Since each ridge 54 has a radially continuous surface, the forces by each ridge 54 on the cable 100 can distribute and equalize as needed to accommodate the cable 100. The forces on the cable 100 by each ridge 54 can also adjust for small dimensional irregularities in the cable 100 without over concentrating the forces on any particular area of the cable 100.

Also, because the ridges 54 make a plurality of discontinuous longitudinal surface contacts, the longitudinal frictional forces which would build up otherwise on the cable 100 during cable insertion are reduced. In actual installation, however, it is still desirable to apply a lubricant to the cable 100 or the ridges 54 in a passageway 50 to ease cable insertion as is typical in most instances of cable installation. While not illustrated, the end of the cable 100 is actually taped with vinyl tape or the like before its insertion.

Figure 6:
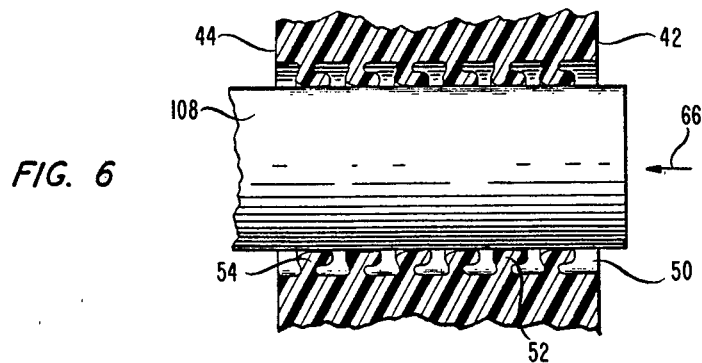
FIG. 6 shows a non-slitted passageway with the ridges deforming in somewhat exaggerated fashion to grip an inserted cable when resisting attempted cable pull out from the outer grommet face.

Referring now to FIG. 6, because each ridge 54 is disposed toward the inner grommet face 42 and is sufficiently thick and stiff in longitudinal cross section, each ridge 54 cannot readily flex toward the outer grommet face 44 once the cable 100 has been inserted. Instead, each ridge 54 tends to deform and push radially inward to tighten onto the inserted cable 100 when resisting cable pull out from the outer grommet face 44, i.e., the direction denoted by arrow 66. Surface contact between each ridge 54 and a cable 100 also tends to increase as each ridge 54 deforms to enhance the overall grip by each ridge 54.

In the illustrative embodiment, urethane rubber having a Shore A hardness in the range of 55–70 was found suitable in manufacturing grommets with non-slitted passageways 50 having the above features. In longitudinal cross section, each ridge 54 had a nominal thickness t substantially less than its nominal height h as seen in FIG. 4.

It is apparent that the actual dimensions of the ridges 54 and the sidewall 52 in any passageway 50 can be chosen as needed to optimize the passageway 50 for the specific cable sizes to be accommodated.

A grommet having the slitted passageways 70 is used primarily in repairing existing splice cases 10 where the tip cables 100 are already spliced and cannot longitudinally pass through the passageways 50.

As seen in FIGS. 2 and 3, each slitted passageway 70 has a longitudinally-extending slit 71 in the grommet body which extends radially to the longitudinal outer surface 46 to provide access for sliding a cable 100 into the passageway 70. A cable 100 is inserted by separating the passageway 70 at the slit 71 and pushing the cable 100 transversely into the passageway 70.

Figure 7:
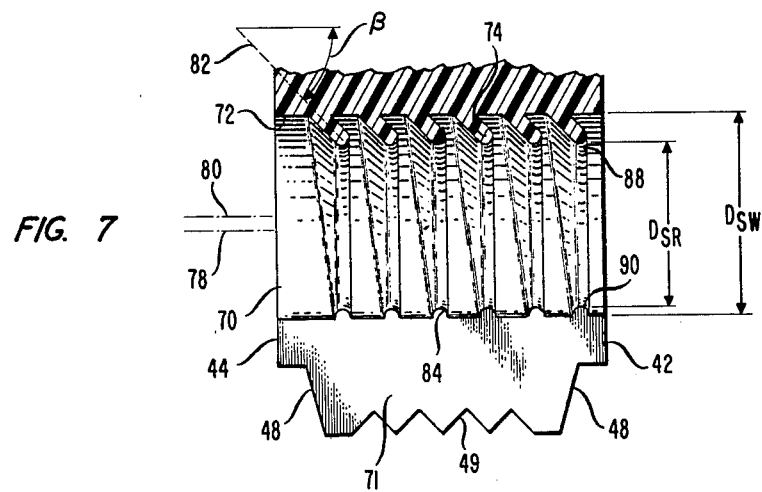
FIG. 7 is an enlarged longitudinal cross section taken along line 7—7 in FIG. 3 of one of the slitted cable receiving passageways.

Referring to FIGS. 3 and 7, the slitted passageway 70 is defined by a cylindrical interior sidewall 72 having a nominal diameter $D_{SW}$ larger than the diameter of any cable 100 to be inserted, and a plurality of longitudinally spaced circumferential ridges 74 defining substantially circular openings 76 normally having diameters $D_{SR}$ smaller than the diameter of any cable 100 to be inserted.

For a substantial portion of its circumference, each ridge 74 is angularly disposed toward the inner grommet face 42 and has in longitudinal cross section an axis of projection 82 which forms an oblique angle $\beta$ with respect to axis 80 of the passageway 70. In the illustrative embodiment, the axis 80 of the passageway 70 is also the axis of the interior sidewall 72. Each ridge 74 is also sufficiently elongated for the substantial portion so as to be capable of flexing with respect to its axis of projection 82 along the substantial portion.

Similar to the ridges 54, each ridge 74 in longitudinal cross section is rounded at its free end 88. However, each ridge 74 varies in projected length from the interior sidewall 72 along its circumference. The change in projected length along the circumference is gradual for each ridge 74. Also, each ridge 74 forms a stub-like portion 90 which is substantially inflexible in the vicinity of the slit 71.

For the substantial portion where each ridge 74 is sufficiently elongated to flex about its axis of projection 82, the ridge 74 is capable of flexing as needed to enlarge its opening 76 during cable insertion. However, in the vicinity of the slit 71, each ridge 74 is substantially incapable of flexing and can only slightly deform under compression in the radial direction.

The inflexibility of each ridge 74 in the vicinity of the slit 71 ensures substantial longitudinal alignment of the edges 84 on each ridge 74 at the slit 71 when the slit 71 closes after cable insertion. This helps to ensure substantial circumferential surface continuity in each ridge 74 for achieving an effective radial seal about an inserted cable 100.

In the passageway 70 in the illustrative embodiment, the slit 71 is longitudinally-extending and the ridges 74 are longitudinally aligned with one another so that an imaginary straight line 78 substantially contains the centers of their openings 76. This imaginary line 78 is radially offset though parallel with respect to the axis 80 of the passageway 70. Hence, only one ridge 74 can be seen in FIG. 3. As is representative of the other ridges 74, the ridge 74 shown in FIG. 3 is most elongated along its circumference at a point diametrically opposite to the slit 71 in the passageway 70 and most shortened or stub-like at the slit 71.

It is apparent that the slit 71 can actually extend diagonally rather than longitudinally, in which case the centers of the openings 76 would be contained in an imaginary curved line, still not coincident with the axis 80.

Figure 8:
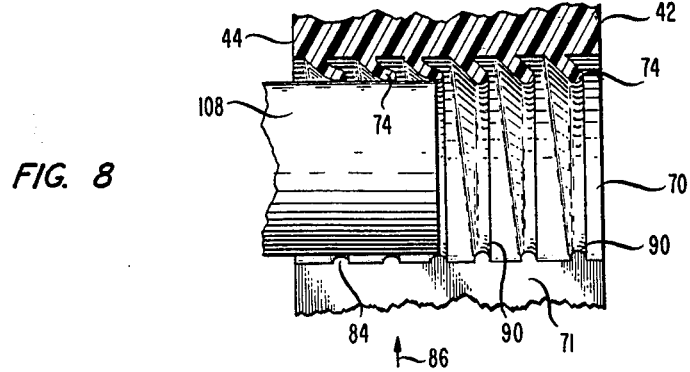
FIG. 8 is the FIG. 7 slitted passageway showing the circumferential ridges flexed where they are elongated and not flexed where they are stub-like when the cable has been inserted.

FIG. 8 depicts the slitted passageway 70 with a cable 100 which has been inserted transversely into the passageway 70 from the direction denoted by arrow 86. For purposes of illustration, the cable 100 is longitudinally positioned to engage only some of the ridges 74 upon insertion, though it is apparent that the end of the cable 100 normally extends beyond the inner face 42 of the grommet 40.

Since each ridge 74 is angularly disposed for a substantial portion of its circumference toward the inner grommet face 42, the substantial portion of each ridge 74 which is capable of flexing will flex toward the inner grommet face 42 during cable insertion as seen of the three ridges 74 on the left in FIG. 8.

For the stub-like portions 90 of the three ridges 74, no flexing has occurred. Hence, when the slit 71 closes, the edges 84 of the stub-like portion 90 on each ridge 74 automatically align at the slit 71 to provide substantial longitudinal alignment and radial surface continuity to help form an effective radial seal about the cable 100.

The forces applied by each ridge 74 have equalized about the inserted cable 100 in FIG. 8. It can be seen that in order for each ridge 74 to apply an equal but opposite force on the inserted cable 100 at the slit 71 and at a point on the cable 100 diametrically away from the slit 71, the ridge 74 has deflected more by flexing at the point away from the slit 71 than by materially deforming at the slit 71. Hence, by having a ridge 74 that can flex for a substantial portion, more gentle forces are applied to sealably engage the inserted cable 100 than if the ridge 74 could only compress and materially deform.

In the illustrative embodiment, each ridge 74 in the slitted passageway 70 is elongated and flexible for at least 270 degrees of its circumference.

Hence, while FIG. 5 depicts the non-slitted passageway 50 in longitudinal cross section, it is also an accurate depiction of the slitted passageway 70 with an inserted cable 100 as seen in a cross-sectional view normal to the view in FIG. 8.

During installation of a grommet 40 having slitted passageways 70, sealing compound is applied along the longitudinal slits 71 before insertion of the tip cables 100 to ensure an effective gas tight seal along the slits 71. When the shells 18 are joined, they supply radially inward forces on the grommet 40 to help ensure that the slits 71 close completely. Lubricant is also applied to the ridges 74 to ease cable insertion.

While the invention has been described with reference to specific embodiments, it is understood that various modifications might be made thereto without departing from the spirit and scope of the following claims.

I claim:

1. A splice case (10) for connecting at least one multiconductor telecommunication cable (100) to at least one other multiconductor telecommunication cable (120), the splice case comprising:
   a substantially tubular casing (12) including first and second substantially half-tubular shells (18);
   means for joining (24, 25, 26) the shells, the joined shells defining an access opening (14) at either longitudinal end (16) of the casing; and
   end means, positioned at each of the access openings of the casing and configured for accommodating one or more cables, at least one of the end means comprising:
      at least one sealing grommet (40) made of a unitary elastomeric body comprising:
         inner (42) and outer faces (44);
         a substantially longitudinal outer surface means (46) connecting the faces;
         at least one cable receiving passageway (50, 70) in communication with both faces, the passageway comprising:
            an interior sidewall (52, 72) having a diameter ($D_W$, $D_{SW}$) larger than that of any cable (100) to be inserted;
            a plurality of longitudinally spaced circumferential ridges (54, 74), each ridge extending integrally from the interior sidewall and defining an opening (56, 76) having a diameter ($D_R$, $D_{SR}$) normally smaller than that of any cable to be inserted, and where for a substantial portion of its circumference, each ridge has an axis of projection (60, 82) which forms an oblique angle ($\alpha$, $\beta$) with respect to the axis (58, 80) of the passageway and is sufficiently elongated in longitudinal cross section so as to be capable of flexing with respect to the axis of projection, whereby the ridge can flex along the substantial portion to help enlarge the opening diameter as needed to accommodate and form a radial seal about a cable being inserted,
   said grommet further including a slit (71) between the longitudinal outer surface means (46) and at least one of the passageways (70) and where each ridge (74) in the slitted passageway varies in projecting length to become stub-like in the vicinity of the slit (71) and substantially incapable of flexing.

2. The splice case (10) pursuant to claim 1 where for the substantial portion, each ridge (54, 74) is angularly disposed toward the inner grommet face (42); and
   where each ridge is capable of deforming and tends to deform and push radially inward toward the axis (58, 80) of the passageway (50, 70) to grip an inserted cable (100) during attempted cable pull out from the outer grommet face (44).

3. The splice case (10) pursuant to claim 2 where for the substantial portion, the axis of projection (60, 82) of each ridge (54, 74) forms a 45 to 60 degree angle with respect to the axis (58, 80) of the passageway (50, 70).

4. The splice case (10) pursuant to claim 1 where in the passageway (50, 70), the ridges (54, 74) are sufficiently longitudinally spaced from one another such that each ridge can flex independently without interference from adjacent ridges during cable insertion.

5. The splice case (10) pursuant to claim 1 where each ridge (54) is circumferentially continuous and has a circumferentially uniform longitudinal cross section which is oblong-like and rounded at its free end (62).

6. The splice case (10) pursuant to claim 1 where in the slitted passageway (70), each ridge (74) has along its entire circumference, a longitudinal cross section which is rounded at its free end (88) but which varies in projecting length.

7. The splice case (10) pursuant to claim 1 where in the slitted passageway (70), the substantial portion of the circumference of each ridge (74), which is capable of flexing, includes at least 270 degrees of the circumference.

8. The splice case (10) pursuant to claim 1 where the shells (18) together define an annular groove (34) at least one end (16) of the casing (12); and
   where the outer surface means (46) of the grommet (40) seats into the annular groove.

9. A sealing grommet (40) for engaging cables (100) or the like and made of a unitary molded elastomeric body comprising inner face (42), an outer face (44), and a substantially longitudinal outer surface means (46), the grommet body further comprising:
   at least one cable receiving passageway (50, 70) in communication with both faces, the passageway comprising:
      an interior sidewall (52, 72) having a diameter ($D_W$, $D_{SW}$) larger than that of any cable to be inserted;
      a plurality of longitudinally spaced circumferential ridges (54, 74), each ridge extending integrally from the interior sidewall and defining an opening (56, 76) having a diameter ($D_R$, $D_{SR}$) normally smaller than that of any cable to be inserted, and where for a substantial portion of its circumference, each ridge has an axis of projection (60, 82) which forms an oblique angle ($\alpha$, $\beta$) with respect to the axis (58, 80) of the passageway and is sufficiently elongated in longitudinal cross section so as to be capable of flexing with respect to the axis of projection, whereby the ridge can flex along the substantial portion to help enlarge the opening diameter as needed to accommodate and form a radial seal about a cable being inserted, said grommet further including a slit (71) between the longitudinal outer surface means (46) and at least one of the passageways (70) and where each ridge (74) in the slitted passageway varies in projecting length to become stub-like in the vicinity of the slit and substantially incapable of flexing.

10. The grommet (40) pursuant to claim 8 where for the substantial portion, each ridge (54, 74) is angularly disposed toward the inner grommet face (42); and where each ridge is capable of deforming and tends to deform and push radially inward toward the axis (58, 70) of the passageway (50, 70) to grip an inserted cable (100) during attempted cable pull out from the outer grommet face (44).

11. The grommet (40) pursuant to claim 10 where for the substantial portion, the axis of projection (60, 82) of each ridge (54, 74) forms a 45 to 60 degree angle ($\alpha$, $\beta$) with respect to the axis (58, 80) of the passageway (50, 70).

12. The grommet (40) pursuant to claim 9 where in the passageway (50, 70), the ridges (54, 74) are sufficiently longitudinally spaced from one another such that each ridge can flex independently without interference from adjacent ridges during cable insertion.

13. The grommet (40) pursuant to claim 9 where each ridge (54) is circumferentially continuous and has a circumferentially uniform longitudinal cross section which is oblong-like and rounded at its free end (62).

14. The grommet (40) pursuant to claim 9 where in the slitted passageway (70), each ridge (74) has along its entire circumference, a longitudinal cross section which is rounded at its free end (88) but which varies in projecting length.

15. The grommet (40) pursuant to claim 9 where in the slitted passageway (70), the substantial portion of the circumference of each ridge (74), which is capable of flexing, includes at least 270 degrees of the circumference.

16. The grommet (40) pursuant to claim 9 where in the slitted passageway (70), the centers of the openings (76) of all ridges (74) are substantially contained in an imaginary line (78), which is offset with respect to the axis (80) of the interior sidewall (72).

* * * * *